United States Patent [19]

Staab

[11] Patent Number: 4,782,880

[45] Date of Patent: Nov. 8, 1988

[54] HIGH PERFORMANCE PASSENGER TIRE

[75] Inventor: Paul C. Staab, Akron, Ohio

[73] Assignee: The Uniroyal Goodrich Tire Company, Akron, Ohio

[21] Appl. No.: 102,751

[22] Filed: Sep. 24, 1987

Related U.S. Application Data

[63] Continuation of Ser. No. 798,072, Nov. 14, 1985, abandoned.

[51] Int. Cl.$^4$ .............................................. B60C 15/06
[52] U.S. Cl. .................................... 152/542; 152/546; 152/554
[58] Field of Search ............... 152/536, 542, 543, 546, 152/527, 554, 548, 560

[56] References Cited

U.S. PATENT DOCUMENTS

| | | | |
|---|---|---|---|
| 3,118,482 | 1/1964 | Beissner | 152/542 |
| 3,638,705 | 2/1972 | Devienne et al. | 152/542 |
| 3,774,663 | 11/1973 | Montagne | 152/542 |
| 3,888,292 | 6/1975 | Menell et al. | 152/542 |
| 4,024,901 | 5/1977 | Poque | 152/542 |
| 4,129,162 | 12/1978 | Dewitt | 152/542 |

FOREIGN PATENT DOCUMENTS 0079588  5/1983  European Pat. Off. ............ 152/528

Primary Examiner—Michael W. Ball
Assistant Examiner—Ramon R. Hoch
Attorney, Agent, or Firm—Michael Colitz; John Haney; Alan A. Csontos

[57] ABSTRACT

A high performance passenger tire features improved bead assemblies. The bead assemblies include a split ply formed of two short insert plies of rubberized steel cords bent around the bead cores with their inside ends extending radially outwardly from the bead cores a distance greater than the distance from their outside ends to the bead cores. The cords of the insert plies form low angles with respect to the circumferential center line of said tire. The bead assemblies have extended utility when utilized in high performance belted radial pneumatic tires.

5 Claims, 2 Drawing Sheets

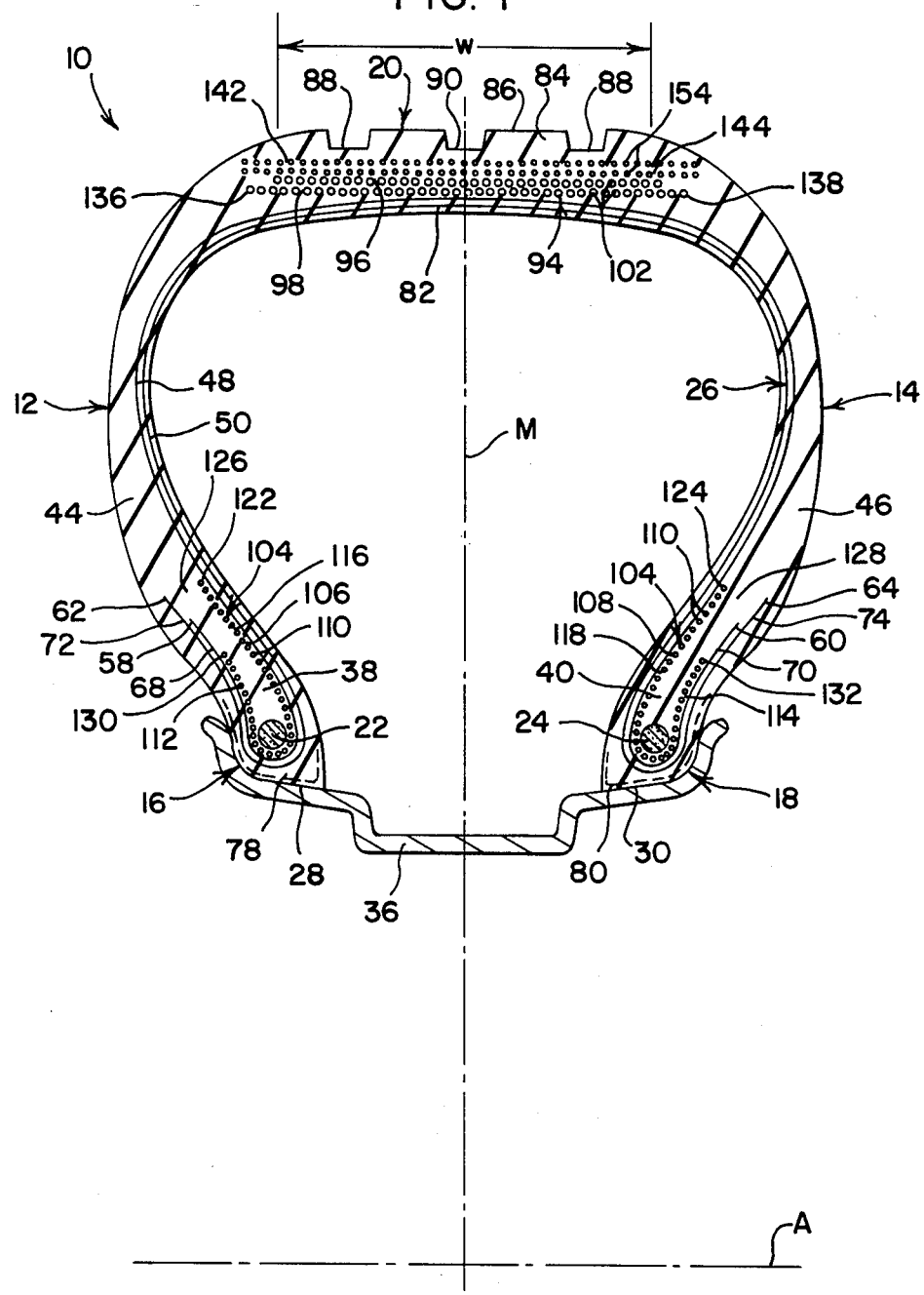

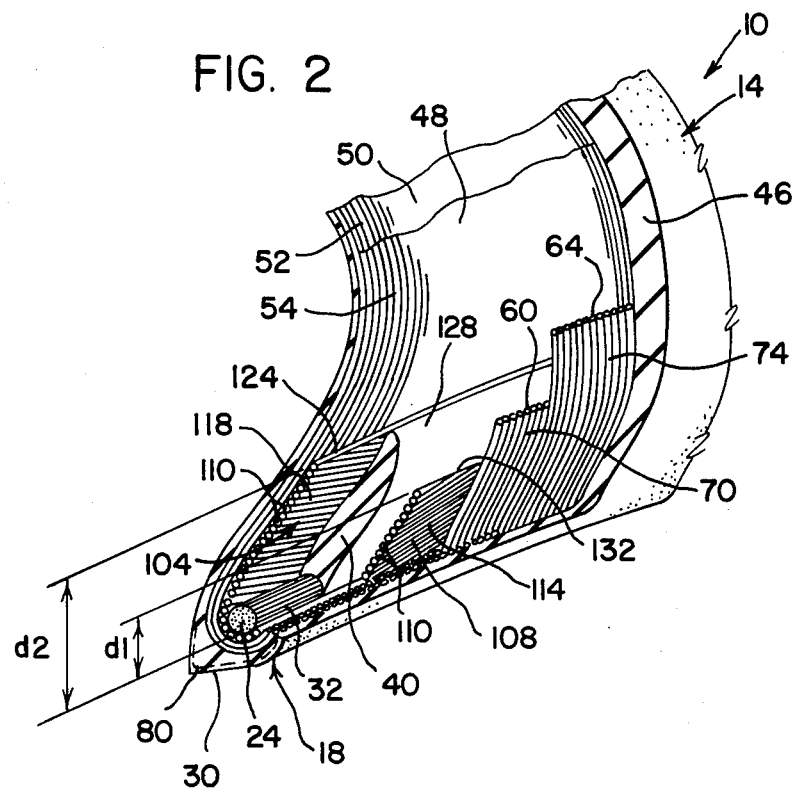
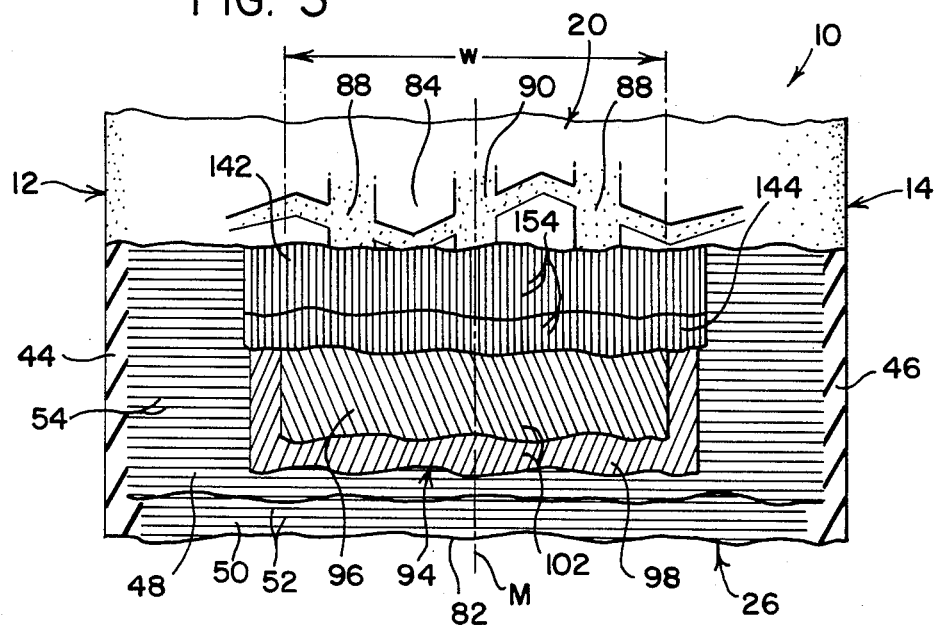

HIGH PERFORMANCE PASSENGER TIRE

This is a continuation of co-pending application Ser. No. 798,072, filed on Nov. 14, 1985, now abandoned.

BACKGROUND OF THE INVENTION

This invention relates to high performance passenger tires and, more particularly, to belted radial pneumatic tires with improved bead assemblies suited for use on high performance automobiles with atypically high speed capability.

There are vehicles, principally automobiles, available presently which are designed, engineered, and manufactured to perform at atypically high speeds. Some of these high performance automobiles are capable of operation at speeds in excess of 130 mph (210 km/hr). Manufacturers, drivers, and passengers of these high performance automobiles have come to expect that certain of the principal parts or accessories for these automobiles, such as tires, be suitable for or compatible with the high speed capability of such automobiles.

To fulfill these expectations, tire manufacturers are now designing, engineering, and manufacturing tires to be particularly suited for use on such high performance automobiles. Some of these tires carry "speed-ratings" to indicate their suitability for particular types of vehicles. For example, tires are now produced for the consumer market with a speed rating of "V" indicating a suitability for or compatibility with certain types of sports cars, luxury touring automobiles, and law enforcement pursuit vehicles with top speed capabilities over 130 mph (210 km/hr).

One goal of ongoing high performance tire development is to evolve toward advanced tire constructions which further improve performance properties such as safety, comfort and high speed capabilities in excess of minimum V-rated speeds without disrupting the overall balance of handling characteristics. Such advanced tire must, therefore, necessarily possess many construction, compound, and design features which may compromise the desired handling characteristics of the tire.

It has long been recognized that the use of advanced construction features such as reinforcements in the bead areas can improve the performance of pneumatic tires. Examples of such reinforcements can be found in U.S. Pat. Nos. 2,493,614 and 3,253,639. These patents recognize and discuss the problems of radial and circumferential deformations in the bead assemblies of tires which result in shear stresses during operation and use of such tires. However, in both of these patents, the concern is with larger, heavy-duty, low speed truck tires which are subjected to operating conditions which are very severe, but very different from the conditions encountered in the smaller, high speed automobile tires of the present invention. The improvements described in these patents are clearly different in structure including construction and placement within the tire from the improvements of the present invention. The improvements in the bead assemblies as described in the prior patents are also clearly different in function since the present invention is directed to a tire for use with high speed automobiles rather than a tire for use with low speed trucks.

A belted radial pneumatic tire constructed for high speed and superior handling characteristics in which the bead assemblies of the present invention could be readily utilized is disclosed in U.S. patent application Ser. No. 669,163 entitled HIGH PERFORMANCE TIRE, filed Nov. 7, 1984, and assigned to the assignee of the present invention. According to the disclosure of that patent application, an annular belt assembly utilizes folded belt plies in association with pairs of narrow superposed strips overlying the folds at the margins of the folded belt plies. The utilization of such folded belt plies, along with the associated excess cost of materials, has been found unnecessary to achieve the superior results capable when used in combination with the bead assemblies constructed in accordance with the teachings of the present invention.

A tire with bead assemblies constructed in accordance with the teachings of the present invention has been found to improve all significant performance properties including handling characteristics such as braking, steering response, swingout, plowing, lift throttle oversteer, and cornering stability. These handling characteristics were subjectively graded in the conventional fashion by an expert jury navigating, under controlled conditions, either a road course or an autocross course. Such improvements in handling characteristics are possible due to new design features in the bead assemblies, an area of a tire which must be designed, engineered, and manufactured with great attention. The construction of the bead assemblies is recognized to be among the most critical areas for superior tire performance and user safety.

SUMMARY OF THE INVENTION

It is therefore an object of the present invention to provide a high performance passenger tire with improved bead assemblies, particularly suitable for use in belted radial pneumatic tires, which function to insure high speed capabilities and handling characteristics, and which presents no peculiar manufacturing problems.

This and other objects of the present invention are achieved by a high performance belted radial pneumatic passenger tire having bead assemblies with a supplemental split ply formed of short insert plies folded around the bead cores, high inside and low outside, with steel cords at low angles with respect to the circumferential center line of the tire.

THE DRAWINGS

FIG. 1 is a cross-sectional view through a portion of a tire constructed in accordance with the principles of the present invention and showing the tire mounted on the wheel rim of an automobile.

FIG. 2 is a perspective view of a portion of the tire shown in FIG. 1 with selected portions removed or broken away to illustrate a portion of a bead assembly including the split third ply.

FIG. 3 is a diagrammatic plan view of the tire shown in FIG. 1 with selected portions removed or broken away to illustrate a portion of the belt assembly.

DETAILED DESCRIPTION

In the Figures, a radial pneumatic passenger tire 10 is shown which includes axially spaced sidewall portions 12 and 14; axially spaced, annular bead portions or assemblies 16 and 18; and an annular crown portion 20.

The bead assemblies 16 and 18 contain annular inextensible bead members or cores 22 and 24 which serve to rigidify the bead assemblies. The bead assemblies 16 and 18 are located on both sides of the carcass 26, at the radially inward ends 28 and 30 of the tire 10. Within the bead assemblies are the bead cores 22 and 24, bundles of bead wires or cords 32, preferably steel, which are essentially inextensible to preclude the circumferential stretching of the bead assemblies. This is to insure proper maintenance and securement of the tire 10 to the inside flanges of the wheel rim 36 during operation and use of the tire and automobile upon which the tire is mounted. Extending radially outwardly from the bead cores are the bead filler and sidewall stabilizer strips 38 and 40.

The sidewall portions 12 and 14 extend radially outwardly from the bead assemblies 16 and 18 to join the axial margins of the tire crown portion 20. The sidewall portions 12 and 14 include layers of sidewall rubber 44 and 46 specially compounded for flexibility and which cover and protect portions of a load-carrying and reinforcing carcass 26. The carcass is composed of two plies 48 and 50 of rubberized, mutually parallel, reinforcing cords 52 and 54, respectively.

The initial rigidity of the sidewalls and bead assemblies is attained through these textile carcass cords 52 and 54 which are embedded inside the two full layers or plies 48 and 50. These are referred to as full plies since they extend from one bead assembly 16 to the other 18.

The carcass cords 52 and 54 are of textile material, preferably rayon, and extend radially of the tire 10. In other words, the cords 52 and 54 of plies 48 and 50 are oriented at substantially a 90 degree angle relative to the medial plane M, a plane which is both normal to the rotational axis A of the tire and which contains the circumferential center line of the tire 10. The reinforcing cords 52 and 54 of the plies 48 and 50 are preferably constructed with diameters and end counts which are conventional for industry use.

Each carcass ply 48 and 50 is anchored or tied into the bead assemblies 16 and 18 by having its respective margins or ends 58,60,62 and 64 turned up and around bead cores 22 and 24. This construction forms carcass ply turn ups 68,70,72 and 74. The term "up" or "high" or "radially outward" or the like is intended to mean in a direction away from the axis of rotation A. The term "down" or "low" or "radially inward" or the like is intended to mean in a direction toward the axis of rotation A.

Each end 62 and 64 of the second full ply 50 extends radially outwardly from its associated bead core a distance beyond its adjacent bead filler and sidewall stabilizer strip 38 and 40. Each end 58 and 60 of the first full ply 48 extends radially outwardly from its associated bead core a distance less than the end 62 and 64 of the adjacent second full ply 50 and less than the end of its associated bead filler and sidewall stabilizer strip 38 and 40. The finishing strips 78 and 80 then encompass the radially inward portions of the two full plies as well as the bead cores in the bead assemblies at the lower sidewall areas. Further and more complete descriptions of the bead assemblies will be provided hereinafter.

Since the carcass 26 and its plies 48 and 50 are full or continuous from bead assembly 16 to bead assembly 18, they therefore include an axially disposed portion 82 within and forming part of the annular crown portion 20 of the tire. The crown portion 20 of tire 10 also comprises an annular tread element 84 disposed radially outwardly of the axially disposed portion 82 of carcass 26. Tread element 84 is a rubber composition specially compounded to protect carcass 26 and to provide certain road contacting and skid resistance properties to the tire 10. Tread element 84 features an outer surface 86 with a selected tread design or pattern which includes annular, axially spaced, axially outer circumferential grooves 88 and one or more annular grooves 90 disposed between outer grooves 88. The tread surface and pattern thereon is generally designed to present a width "w" of preselected magnitude intended for contact with the roadway during rotation of the tire 10, which width is often referred to as the "tread contact width."

Disposed radially inwardly of tread element 84 and radially outwardly of the axially disposed portion 82 of carcass 26 is an annular belt assembly, indicated generally as 94, comprising two principal or main belt plies 96 and 98 of rubberized, mutually parallel cords 102. The cords 102 are preferably steel, at conventional diameters and end counts within the plies, such as diameters of between about 0.25 mm to about 0.32 mm and end counts of between 14 to 24 ends/in (5.5 ends/cm to 9.4 ends/cm). A more complete description of the belt assembly will be provided hereinafter.

In accordance with the present invention, additional rigidity is attained at the bead assemblies and the lower or downward portions of the sidewalls by the addition of a split ply 104 formed of two short insert layers or plies 106 and 108 of rubberized cords 110 of steel wire. Unlike the full plies, these insert plies are discontinuous or split between the bead assemblies and do not extend from bead to bead. This feature of added rigidity as provided by the split ply is in addition to the initial rigidity of the bead assemblies as provided by the carcass cords 52 and 54.

The added rigidity and stability of the lower sidewall area adjacent the bead assemblies is provided through the placement as well as the construction of the split ply 104.

As can be seen particularly in FIGS. 1 and 2, the split ply 104 is formed of two short insert plies 106 and 108, each of which is placed and positioned within a bead assembly with its outside portion constituting a turn up 112 and 114 generally parallel with the turn ups 68, 70, 72 and 74 of the full plies. The inside portion 116 and 118 of each insert ply is generally parallel with the full plies on the inside of the beads. As used herein, the term "inside" or "axially inward" or the like is intended to mean that side closer to the medial plane M of the tire. The term "outside" or "axially outward" or the like is intended to mean that side farther from the medial plane M of the tire.

More particularly with regard to placement, each insert ply 106 and 108 is positioned around its adjacent bead core 22 and 24 and bead filler and sidewall stabilizer strips 38 and 40. The bead cores 22 and 24 and insert plies 106 and 108 are then surrounded by the first full ply 48 and then by the second full ply 50 at the lower or inward ends 8 and 30 of the tire 10. From its inside end 122 and 124, each insert ply extends radially inwardly from a position adjacent the outside of the radially exterior end 126 and 128 of its adjacent bead filler and sidewall stabilizer strip 38 and 40, around the bead core 22 and 24 and then radially outwardly so that the outside end 130 and 132 of each insert ply is located at approximately the midpoint of the outside face of the adjacent bead filler and sidewall stabilizer strip 38 and 40. This distance between each outside end 130 and 132 of the split ply and its adjacent bead core is less than the distance of the ends 58, 60, 62 and 64 of the first and second full plies from the bead cores.

The outside end 130 and 132 of each insert ply is at a first distance d1 from its adjacent bead core. The inside end 122 and 124 of each short insert ply is at a second distance d2 from its associated bead core. The second distance is greater than the first distance, about twice the distance The second distance can be between about 150% and about 250% of the first distance. This orientation of the ends of the short insert plies of the split ply may be referred to as "high inside and low outside."

The construction of the two insert plies is of rubberized steel reinforcing cords 110 which are mutually parallel, one cord to another. The steel wires or cords 110 within the short insert plies 106 and 108 are at low angles, between about 15 and 45 degrees, with respect to the circumferential center line of the tire, preferably about 30 degrees. Note is taken that the opposing portions of each short insert ply are located on opposite sides of the bead filler and sidewall stabilizer strips and bead cores and thus provide cords disposed in opposing angular orientations or directions with respect to both the circumferential center line of the tire and the radial cords 52 and 54 of the first and second full plies 48 and 50 in the sidewalls. The particular orientation of the low angle cords in opposing orientations, taken in conjunction with the high inside and low outside placement of the insert plies, has been found to provide superior radial and circumferential rigidity to the lower sidewalls of the tire, particularly circumferentially, as is desired for tires for use on high performance, high speed automobiles. Also, to prevent generation of conicity forces, inside ends 122 and 124 of each insert ply should be oriented in opposing directions.

In order to facilitate folding of the insert plies 106 and 108 around the bead cores to form the split ply turn ups, the cords 110 of the split plies are preferably fabricated of a small diameter steel wire with low end counts. Such reduced diameter and reduced end count are both preferably lower than those typically used in plies with steel cords at other areas of conventional tires such as those found in the belt plies 96 and 98. Preferred diameters for the steel wide cords 110 range up to about 0.22 mm and the plies 106 and 108 preferably have end counts up to about 12 ends per in (4.72 ends per cm).

As referred to hereinabove, the present inventive bead assemblies 16 and 18 have been found to have extended utility when used in belted radial pneumatic tires. Such a tire is shown in the drawings, particularly in FIGS. 1 and 3. In these Figures, lateral margins 136 and 138 of belt assembly 94 are defined by the lateral edges of radially inner belt ply 98. It is preferred that the width of the belt assembly 94 between margins 136 an 138 be at least as wide as the tread contact width w. However, the width of belt assembly 94 can be greater than the tread contact width w as shown in FIGS. 1 and 3, and if so, preferably does not exceed 115% of the tread contact width w.

As seen further in the Figures, outer belt ply 96 is narrower than inner belt ply 98. Preferably, the margins of outer ply 96 terminate about ⅛ in (0.3 cm) axially inwardly from the lateral edges of radially inner ply 98. The specific unequal width arrangement of belt plies as shown and described herein provides a belt assembly which resists belt edge separation and provides a staggered presence of non-folded or cut ply edges.

As indicated previously, the belt plies 96 and 98 each comprise a plurality of mutually parallel cords 102. The cords are disposed so as to cross medial plane M at a low acute or bias angle preferably between about 24 degrees and about 28 degrees. The belt plies 96 and 98 are positioned within the tire so that the cords in one of the layers positively slope with respect to medial plane M, and the cords of the other layer negatively slope with respect to the medial plane M.

Belt assembly 94 further preferably comprises a pair of cap plies 142 and 144 of axially spaced, rubberized cords disposed generally along the lateral margin areas of the belt assembly 94 and radially outwardly of the plies 96 and 98. The pair plies 142 and 144 are of substantially identical width but extend axially beyond each belt assembly margin 136,138 by about ⅜ in (0.95 cm) on each side. Each ply 142,144 contains a plurality of textile cords 154, which are preferably nylon, and which are oriented parallel to medial plane M.

The pair of cap plies 142 and 144 effect a restrictive force or pressure against the main belt ply edges or margins to generally support, supplement, or reinforce these margins against separation.

The above-described short insert plies with their specific construction and placement, particularly when used in conjunction with the improved bead assembly as described above, function to maintain user safety, consistent structural integrity, and increased high performance properties including high speed capabilities an improved handling characteristics of tires in which they are utilized.

In addition to the improvements in the bead assemblies 16 and 18 as described above, the present inventive tire also includes improvements in the belt assembly 94. These various improvements to the belt and bead assemblies function in a system-like manner to effect significantly improved results when used on a high performance vehicle.

It is evident that modifications are possible to the preferred embodiments described in detail, which modifications are considered to be within the scope of the invention as measured by the claims.

I claim:

1. A radial pneumatic passenger tire (10) with a speed rating which indicates suitability for use on automobiles capable of speeds in excess of 130 mph (210 km/hr), said tire having an axis of rotation (A) and a medial plane (M) normal to said axis of rotation and containing the circumferential center line of said tire, said tire comprising:

a carcass (26) comprising first and second full plies (48, 50) of rubberized textile cords (54, 52) disposed in planes containing said axis of rotation and substantially normal to said medial plane;

an annular crown portion (20) including an elastomeric tread portion (84) with a road contact surface (86); an annular, axially extending portion (82) of said carcass disposed radially inwardly of said tread portion; and an annular belt assembly (94) comprising at least two cut, unfolded plies (96, 98) of rubberized steel cords (102) of selected diameter and end count, said two cut plies (96, 98) disposed radially between said tread portion and said carcass portion; and bead assemblies (16, 18) including annular bead cores (22, 24) of inextensible wires (32) adjacent each radially inward end (28, 30) of said tire, and ends (58, 60, 62, 64) of said first and second plies (48, 50) of rubberized textile cords folded around their adjacent bead cores (22, 24) to define turn ups (68, 70, 72, 74) extending such that each end (62, 64) of said second ply (50) is disposed radially outwardly a distance greater than ends (58, 60) of said first ply, said bead assemblies also including a split ply (104)

formed of two short insert plies (106, 108) of rubberized steel cords (110), one said insert ply for each said bead assembly, each of said insert plies being folded around, and in direct contact with, its adjacent bead core and positioned between said first and second full plies and said bead cores, each of said insert plies having axially inside ends (122, 124) and axially outside ends (130, 132) and being disposed such that each inside end (122, 124), as well as each of the carcass turn up ends (58, 60, 62, 64) extends radially outwardly from its adjacent bead core for a distance greater than a distance (d1) which each outside end (130, 132) extends from its adjacent bead core, said steel cords of said insert plies being of less diameter and end count than said steel cords of said cut plies of said belt assembly and forming a low bias angle with respect to the circumferential center line of said tire.

2. The tire as set forth in claim 1 wherein said steel cords of said insert plies form an angle with the circumferential center line of said tire of between 15 degrees and 45 degrees.

3. The tire as set forth in claim 2 wherein said steel cords of said insert plies form an angle with the circumferential center line of about 30 degrees.

4. The tire as set forth in claim 2 wherein said steel cords of said insert plies form said angle in opposing directions on opposite sides of their adjacent bead cores such that the steel cords of the inside ends of said insert plies are oriented in opposing directions.

5. The tire as set forth in claim 1 wherein said crown portion includes a pair of cap plies of rubberized nylon cords disposed radially outwardly of said cut plies.

* * * * *